United States Patent [19]
O'Brien et al.

[11] Patent Number: 5,334,425
[45] Date of Patent: Aug. 2, 1994

[54] FLORAL PRESENTATION

[76] Inventors: Martin J. O'Brien, 2542 W. Thomas St., Chicago, Ill. 60622; George Spector, 233 Broadway Rm 3815, New York, N.Y. 10007

[21] Appl. No.: 924,279

[22] Filed: Aug. 3, 1992

[51] Int. Cl.⁵ ............................................. A47G 7/00
[52] U.S. Cl. .................................... 428/23; 248/27.8
[58] Field of Search ............... 428/24, 25, 26, 31, 428/23; 40/592, 597; 248/27.8, 206.2

[56] References Cited
U.S. PATENT DOCUMENTS 2,055,397  9/1936  Zaiger .......................... 248/206.1
3,310,912  3/1967  Melander ........................ 428/23 X
4,600,612  7/1986  Litwin et al. .................... 428/24 X
4,881,485  11/1989 Feinberg ......................... 428/31 X
5,158,355  10/1992 Sarate ............................ 428/24 X Primary Examiner—Henry F. Epstein

[57] ABSTRACT

A floral display device is provided which consists of a lightweight, resilient polystyrene plastic member for receiving and retaining a plurality of flower stems therein in a floral arrangement. A mechanism is for removably attaching the polystyrene plastic member to a flat surface, typically but not limited to the exterior of a motor vehicle, a table and a wall.

4 Claims, 1 Drawing Sheet

U.S. Patent     Aug. 2, 1994     5,334,425
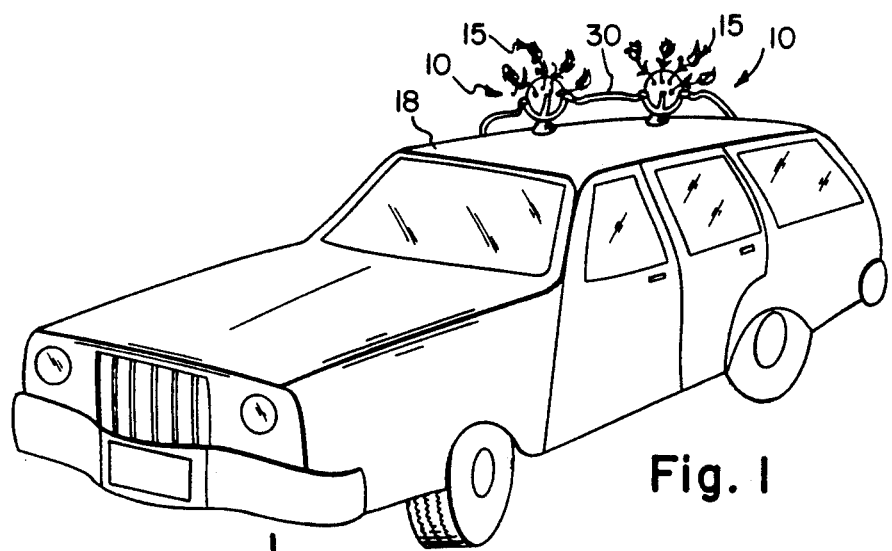
Fig. 1
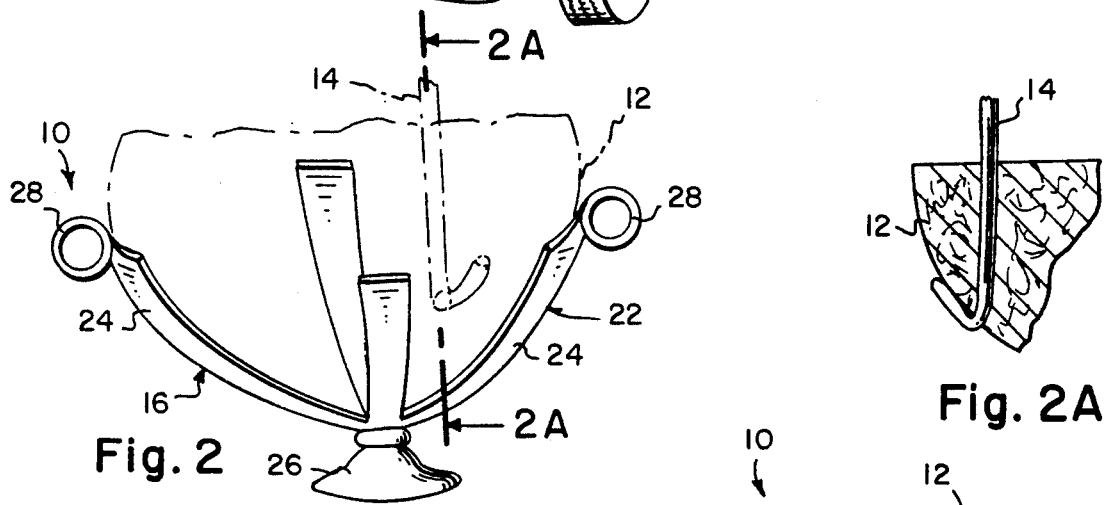
Fig. 2
Fig. 2A
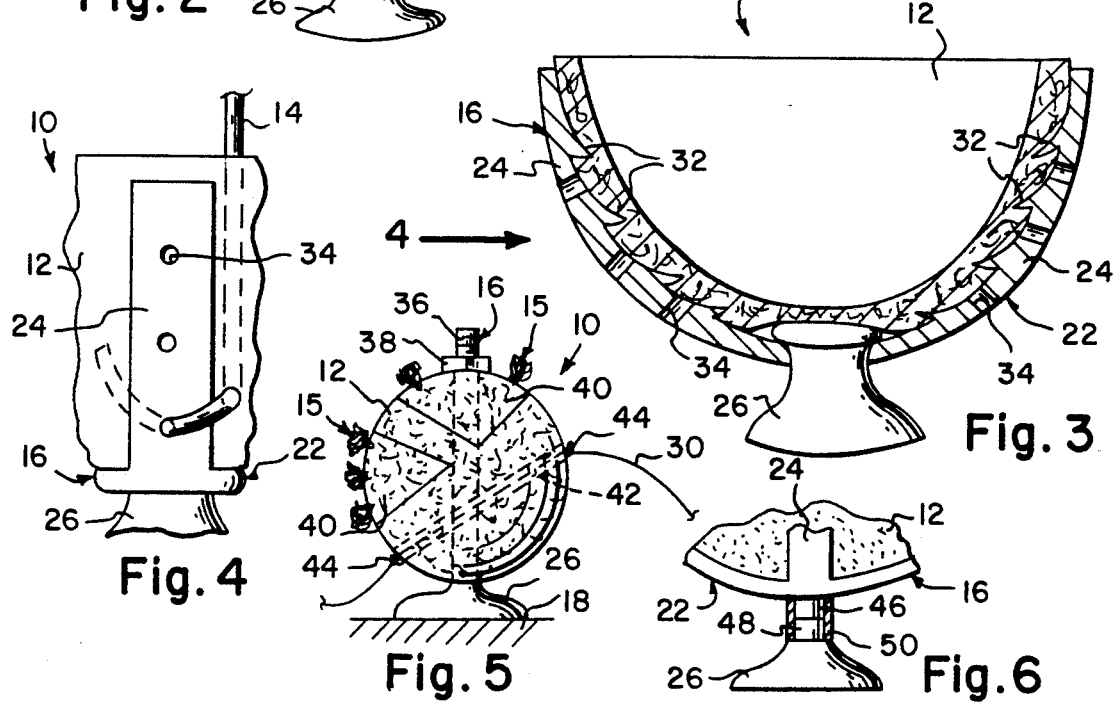
Fig. 3
Fig. 4
Fig. 5
Fig. 6

FLORAL PRESENTATION

BACKGROUND OF THE INVENTION

The instant invention relates generally to flower arrangements and more specifically it relates to a floral display device which provides for decorating an automobile to be used in a wedding, prom, parade and any other event.

There are available various conventional flower arrangements which do not provide the novel improvements of the invention herein disclosed.

SUMMARY OF THE INVENTION

A primary object of the present invention is to provide a floral display device that will overcome the shortcomings of the prior art devices.

Another object is to provide a floral display device that is a better way of decorating a motor vehicle with flowers, which is used for a wedding, prom, parade and any other special event.

An additional object is to provide a floral display device in which a polystyrene plastic member can be removably attached to a flat surface, such as a body of a motor vehicle, so that flower stems can be inserted and retained to the styrofoam ball for decoration.

A further object is to provide a floral display device that is simple and easy to use.

A still further object is to provide a floral display device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of a motor vehicle with two of the floral display devices installed thereon.

FIG. 2 is a perspective view of just the instant invention per se with the polystyrene plastic member in phantom.

FIG. 2A is a cross sectional view taken along line 2A—2A in FIG. 2, showing the flower stem extending through the polystyrene plastic member with the end of the stem bent back to be firmly held in place.

FIG. 3 is a cross sectional view of a first modification showing each arm of the holder having inner grip teeth to better retain the polystyrene plastic member therein and affixing the suction cup thereto.

FIG. 4 is a view taken in direction of arrow 4 in FIG. 3, showing how one flower stem can be attached and retained by the arm of the holder.

FIG. 5 is an elevational view of a second modification showing a threaded shaft and nut for retaining the polystyrene plastic member to the suction cup.

FIG. 6 is an elevational view with parts broken away and in section showing another way of affixing the suction cup to the holder.

DETAILED DESCRIPTION OF THE PREFERRED EMBODIMENTS

Turning now descriptively to the drawings, in which similar reference characters denote similar elements throughout the several views, the Figures illustrate a floral display device 10 which consists of a lightweight, resilient polystyrene plastic member 12 for receiving and retaining a plurality of flower stems 14 therein in a floral arrangement 15. A mechanism 16 is for removably attaching the polystyrene plastic member 12 to a flat surface 18, typically but not limited to the exterior of a motor vehicle, a table and a wall.

The removably attaching mechanism 16, as best seen in FIG. 2, includes a holder 22 having a plurality of spring biased arms 24 extending therefrom. When the polystyrene plastic member 12 is inserted within the holder 22, the arms 24 will retain the polystyrene plastic member 12 to the holder 22. A suction cup 26 is affixed to the bottom of the holder 22, so that the suction cup 26 can stick to the flat surface 18 to removably attach the holder 22 thereto.

At least two rings 28 are also provided with each affixed to a distal end of one of the arms 24 of the holder 22, so that ribbon 30 can be strung through the at least two rings 28 to form a pattern from one holder 22 to another.

As shown in FIGS. 3 and 4, the holder 22 can further include inner grip teeth 32, to better retain the polystyrene plastic member 12 therein. Each arm 24 can have a plurality of holes 34 therethrough. When the flower stems 14 are received and retained in the polystyrene plastic member 12, they can enter the holes 34 and be bent to be firmly held in place.

The removably attaching mechanism 16, shown in FIG. 5, contains a threaded shaft 36 to extend through the polystyrene plastic member 12. A suction cup 26 is affixed to a first end of the threaded shaft 36, so that the suction cup 26 can stick to the flat surface 18 to removably attach the threaded shaft 36 thereto. A nut 38 engages with a second end of the threaded shaft 36 to retain the polystyrene plastic member 12 on the threaded shaft 36.

The polystyrene plastic member 12 can be a sphere, as shown in FIGS. 1, 2 and 5. It can also be a hemisphere, as shown in FIG. 2A and a curved cup, as shown in FIGS. 3 and 4. The flower stems 14 can extend through the polystyrene plastic member 12 and be bent back at their lower ends, as best seen in FIGS. 2, 2A and 4, so that they will be better retained thereto.

As shown in FIG. 5, wedges 40 can be cut out of the sphere-shaped polystyrene plastic member 12. The floral arrangement 15 can be directly fastened to the outer edge of the wedges 40 without the stems 14. The wedges 40 are then reinserted and glued back into the areas that they are cut from. A hole 42 can be placed through the entire sphere-shaped polystyrene plastic member 12, so that ribbon 30 can be inserted through the hole 42. Knots 44 are tied on both ends of the ribbon 30, so that the ribbon can create a variety of variations of display effects.

FIG. 6 shows another way of attaching the suction cup 26 to the holder 22. The holder 22 has a downwardly extending shank 46, while the suction cup 26 has an upwardly extending shank 48. A sleeve 50 fits over both of the shanks 46 and 48 and is secured thereto by glue.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A floral display device which comprises:
a:) a penetratable member for receiving and retaining a plurality of flower stems therein in a floral arrangement;
b) means for removably attaching said member to a flat surface; wherein said removably attaching means includes:
c) a holder having a base with a plurality of spaced spring biased arms extending therefrom, so that when said member is inserted within said holder and spring arms, said arms will retain said member within said holder; and
d) a suction cup affixed to said base, so that said suction cup can stick to the flat surface to removably attach said holder thereto.

2. A floral display device as recited in claim 1, further including at least two rings, each affixed to one of said arms, so that a ribbon can be strung through said rings of a plurality of said devices to form a pattern, from a plurality of floral display devices.

3. A floral display device as recited in claim 2, wherein each said arm of said holder further includes inner grip teeth to better retain said member therein and each said arm having a plurality of holes therethrough, so that when the flower stems are received and retained in said member they can enter said holes and be bent to be firmly held in place.

4. A floral display device comprising:
a) a shaft with a lower end and an upper end adapted to receive thereon a floral display member;
b) a suction cup affixed to said lower end so that said suction cup can stick to a flat surface to removably attach said shaft thereto; and
c) a retainer mounted on said upper end to engage and retain said member on said shaft; wherein:
d) said shaft is threaded and said retainer is a nut;
e) said member has an arcuate surface;
f) said suction cup has an upper side which engages said surface whereby said nut can be operated to impose variable retaining pressure on said member; and
said member has removable portions with displays affixed thereon remountable on said member.

* * * * *